United States Patent

[11] 3,633,637

| [72] | Inventors | Victor A. Kolesh<br>Holden;<br>Edward W. Armstrong, Fitchburg, both of Mass. |
|---|---|---|
| [21] | Appl. No. | 52,548 |
| [22] | Filed | July 6, 1970 |
| [45] | Patented | Jan. 11, 1972 |
| [73] | Assignee | Wallace-Murray Corporation<br>Fitchburg, Mass. |

[54] SEGMENTAL SAW AND METHOD OF MAKING SAME
2 Claims, 6 Drawing Figs.

[52] U.S. Cl. .................................................. 143/139,
29/522, 76/112, 125/15
[51] Int. Cl. ........................................... B27b 33/02

[50] Field of Search ............................................. 76/112;
143/139; 29/522; 125/15; 74/235, 248, 243 CS

[56] References Cited
UNITED STATES PATENTS

| 1,293,897 | 2/1919 | Parker .......................... | 125/15 |
| 3,162,187 | 12/1964 | Christensen .................. | 76/112 X |
| 2,798,473 | 7/1957 | Blum ........................... | 143/139 X |

Primary Examiner—Bernard Stickney
Attorney—Rowland V. Patrick

ABSTRACT: A segmented saw has its teeth-bearing edge segments attached by using a tongue and groove mounting, and removably fastening the segments by swaging metal pins extending through the tongue into counterbores formed in the groove walls on each side of the tongue in concentric or eccentric register with respect to the axis of each pin.

SEGMENTAL SAW AND METHOD OF MAKING SAME

This invention relates to a segmented saw, as exemplified by a circular saw, having its outer periphery formed by a series of separate arcuate teeth-bearing segments.

Such saws are in commercial demand because loss of a tooth or teeth of the saw by accident does not require discarding the whole saw. Rather the lost or damaged tooth is removed as part of a segment which contains it, and then the segment is replaced with a new substitute segment having brand new teeth.

Preferably, in such saws, the segments are attached by forming each of them with an inwardly facing tongue which is received into a peripheral groove in the saw body, though sometimes the grooves are in the segments and the tongues are on the saw body. In either case, the segments are bound to the saw body by conventional countersunk rivets.

The present invention deals with an improved manner of securing the tooth segments to the saw body to give more durable rigidity while simplifying the fabrication by dispensing with certain operations that are presently routinely or occasionally required.

According to the present invention the tongue portions, when on the segments, have a series of cylindrical holes of a given diameter which, when the tongues are inserted into the saw body grooves lie between aligned overlying cylindrical holes of greater diameter located in the forks of the grooved saw body. A headless metal pin is then placed through the small tongue hole and the ends of the pins are swaged into intimate contact with the cylindrical walls of the composite hole regardless of whether the holes are in exact concentric register or are slightly eccentric. The hole configuration which is filled is in either case a "counterbore" hole in the sense that the word is herein used, as distinguished from a countersunk hole. Excess metal is then ground off flush with the sides of the saw body.

Utilization of such "counterbore" rather than countersink construction may strike one as involving a simple change, but the former has always been available and yet the commercial art has clung to the latter requiring the holes in each of the parts to be precisely drilled so that, being of equal diameter except for the countersinks, they line up for insertion of the rivets when assembled. With the use of oversized variable eccentric counterbores, misalignment or nonregistration is rendered harmless because, so long as the counterbores completely overlie the hole in the tongue, the pin may still be inserted, despite imperfect register.

Further, with the construction of this invention one eliminates tapered surfaces which tend to cause the rivets to loosen when subjected to the high stress vibration of a circular saw in operation.

Use of swaging and cold flow of the material of the pins dispenses with the use of hot rivets which are hardened by the heating, thereby making removal of the hardened rivet difficult for replacement.

An embodiment of the invention is shown in the accompanying drawings wherein.

Figure 1:
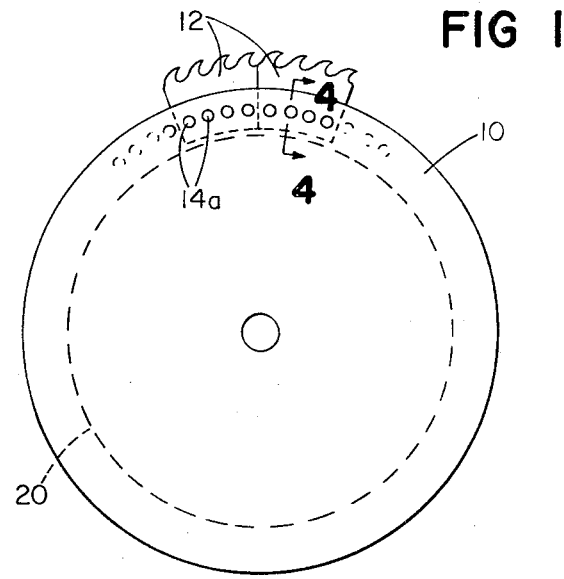
FIG. 1 is a side view of a segmented circular saw.
Figure 2:
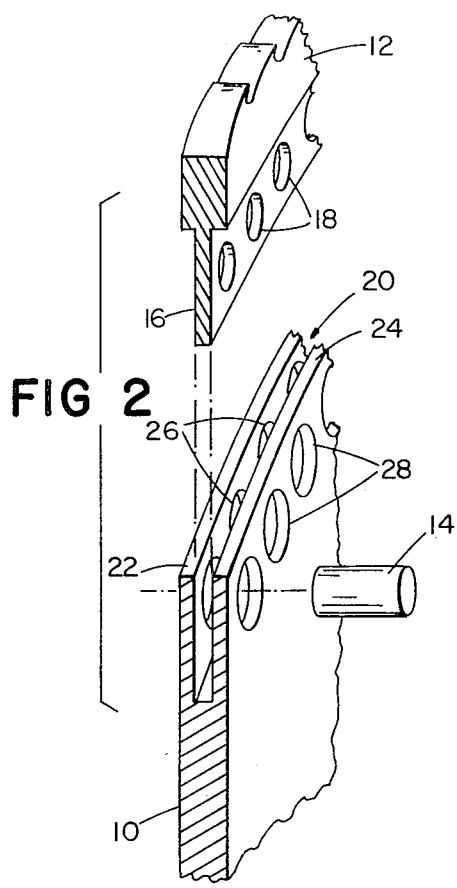
FIG. 2 is an exploded fragmentary view of parts used in fabricating the saw of FIG. 1.

A saw body 10 has mounted on it a series of tooth-curved segments 12 as shown in FIG. 1. One of multiple fastening pins 14 is shown in FIG. 2.

Each tooth segment 12 has a tongue portion 16 pierced with a series of holes 18 on equally spaced centers and of a given uniform diameter.

The saw body 10 has a groove 20 around its curved periphery to receive the tongues 16 of the segments 12. The forked portions 22 and 24 formed by the groove 20 are pierced with pairs of aligned holes 26, 28 spaced on the same centers as the holes 18 but of larger diameter.

Figure 3:
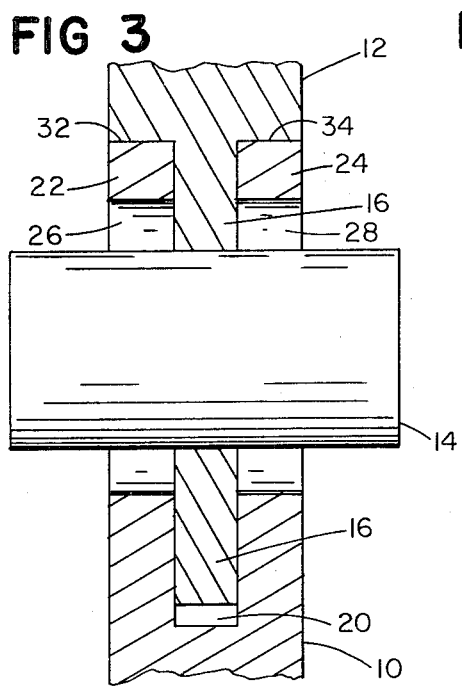
FIG. 3 is a detailed cross-sectional view illustrating the relation of the parts at one stage during the fabrication of the saw.

As shown in FIG. 3, the tongue portion 16 is less deep than the groove 20 so that the tooth segments seat themselves against the end walls 32, 34 of the fork portions 22, 24 of the saw body.

Figure 4:
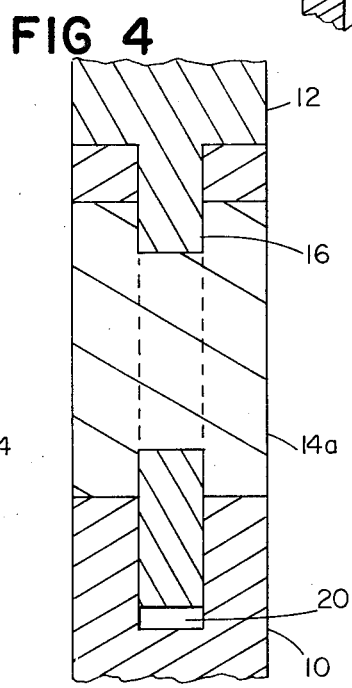
FIG. 4 is an enlarged cross-sectional view taken along the line 4—4 of FIG. 1.

Fastening pins 14 have an initial diameter just less than the diameter of the holes 18 so that they may be inserted through the large holes 26, 28 as shown in FIG. 3 and then swaged to fill them as counterbores as shown in FIG. 4. The sides of the saw may be ground to remove any burr or remaining portion of the pins 14 which have now been swaged into the dumbbell shape shown at 14a in FIG. 4.

As an example, a one-half inch long and one-quarter inch diameter pin 14 may be used with the holes 18 being one-quarter inch and holes 26, 28 being three-eighth inch holes. The rough thickness of the saw body may then be about 0.253 inch with the swaging reducing the length of the finished plug 14a to about 0.223 inch final saw thickness.

As can be seen, the swaged pin 14a is double headed so that it cannot be removed without complete destruction of one of the heads but, unlike a rivet, the pin 14 exerts little if any squeezing force while the swaging causes a flow of material radially from the hole axis against the walls of the holes.

No preheating of the pin is required (though headed pins may be used) and countersinking steps following drilling of the saw body are wholly eliminated. By proper dimensioning of the pin, little material is left to be ground off since there is virtually a flush head after swaging.

Figure 5:
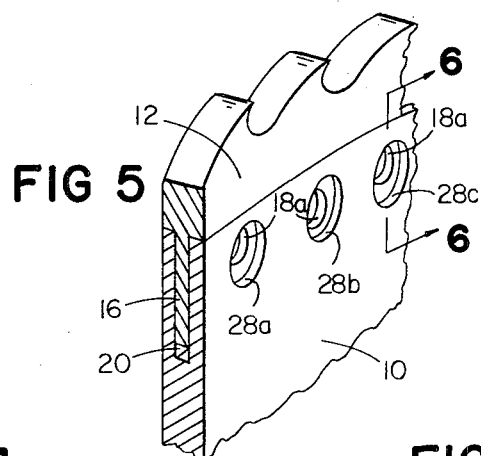
FIG. 5 is an enlarged detail of a saw illustrating the variable eccentric counterbore construction before insertion of the pins 14.
Figure 6:
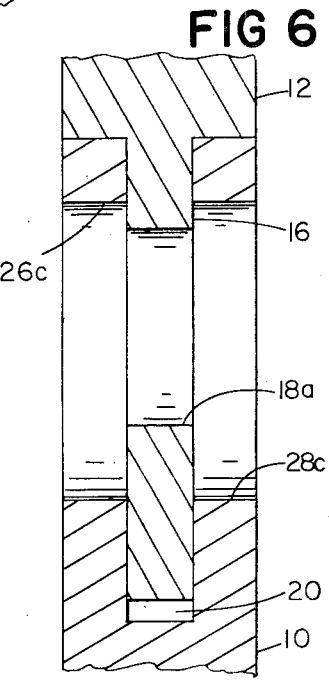
FIG. 6 is an enlarged cross-sectional view taken along the line 6—6 of FIG. 5.

One of the greatest advantages is that if any of the holes have been drilled off center, many segments can still be fastened without redrilling any of the holes because the pins can be inserted without having absolutely accurate register. This is illustrated in FIGS. 5 and 6 wherein the three holes 18a are nonconcentric with the bores 28a, 28b, 28c resulting in an eccentric but satisfactory fastening after a pin has been inserted and swages into, for example, counterbores 26c and 28c as shown in FIG. 6.

Many if not all of the above advantages represent a substantial financial saving to the ultimate user.

What is claimed is:

1. The method of fastening tongued tooth segments in abutting relation along the grooved edge of a saw body, which includes the steps of:
   forming a series of holes of predetermined uniform diameter spaced along the tongued portion of one of said segments,
   forming generally aligned pairs of holes of greater but uniform diameter spaced along the forks of the grooved portion of the saw body,
   assembling the segment and saw body together with each pair of said larger diameter holes overlying a smaller tongue hole so as to form a series of holes counterbored on each side of said saw,
   inserting metal pins through said counterbored holes and
   swaging the metal of said pins into intimate contact with the walls of said holes to substantially fill said counterbored holes and prevent withdrawal of said pins thereby securing said segment against separation from said saw body.

2. A segmented saw comprising a body portion and a series of abutting edge segments assembled in tongue and groove relation with said body portion,
   cylindrical holes in the tongue portions of said edge segments,
   larger cylindrical holes in the groove-forming portions of said saw body, said larger holes overlying said tongue holes to present holes counterbored on both sides of said saw, and
   a single piece of swaged metal plugging each of said counterbored holes to maintain the segments rigidly mounted on said body portion and retain said metal pieces in said holes to prevent inadvertent separation of said segments from said saw body.

* * * * *